United States Patent [19]

Tidwell

[11] 4,230,275
[45] Oct. 28, 1980

[54] SELF-GUIDED REVERSIBLE TWO SPEED ROW CROP IRRIGATOR

[76] Inventor: Hubert Tidwell, Box 57, Wellington, Utah 84542

[21] Appl. No.: 36,065

[22] Filed: May 4, 1979

Related U.S. Application Data

[63] Continuation-in-part of Ser. No. 929,550, Jul. 31, 1978, Pat. No. 4,185,774.

[51] Int. Cl.³ .............................................. B05B 3/18
[52] U.S. Cl. ...................................... 239/184; 180/22; 239/199
[58] Field of Search ................................. 239/159–163, 239/173, 178, 183, 184, 186, 188, 189, 199, 212, 550, 191; 137/344, 355.12; 172/1, 26; 180/6.5, 21, 22, 24.02; 280/47.16

[56] References Cited

U.S. PATENT DOCUMENTS

| | | | |
|---|---|---|---|
| 729,650 | 6/1903 | Olofsson | 239/191 |
| 1,784,251 | 12/1930 | Plumer | 239/199 X |
| 2,892,466 | 6/1959 | Stilwell et al. | 180/21 X |
| 3,009,645 | 11/1961 | Nugent | 239/184 X |
| 3,175,635 | 3/1965 | Bryan | 239/212 X |
| 3,770,202 | 11/1973 | Ivemy et al. | 239/184 |

*Primary Examiner*—Johnny D. Cherry
*Attorney, Agent, or Firm*—B. P. Fishburne, Jr.

[57] ABSTRACT

A wheeled irrigator carriage has a fulcrum around which a piping frame can rock at the ends of crop rows to lift one traction wheel of the irrigator and lower a second traction wheel at the other end of the irrigator into driving engagement with the ground. The second traction wheel has a power drive reversing member associated therewith. An independent higher speed power drive for the first-named traction wheel is provided. The piping frame also serves to deliver irrigating water from a remote source to a pair of spaced irrigation booms on the piping frame which may span several rows of crops. A massive hose reel is supported symmetrically above the fulcrum.

8 Claims, 5 Drawing Figures

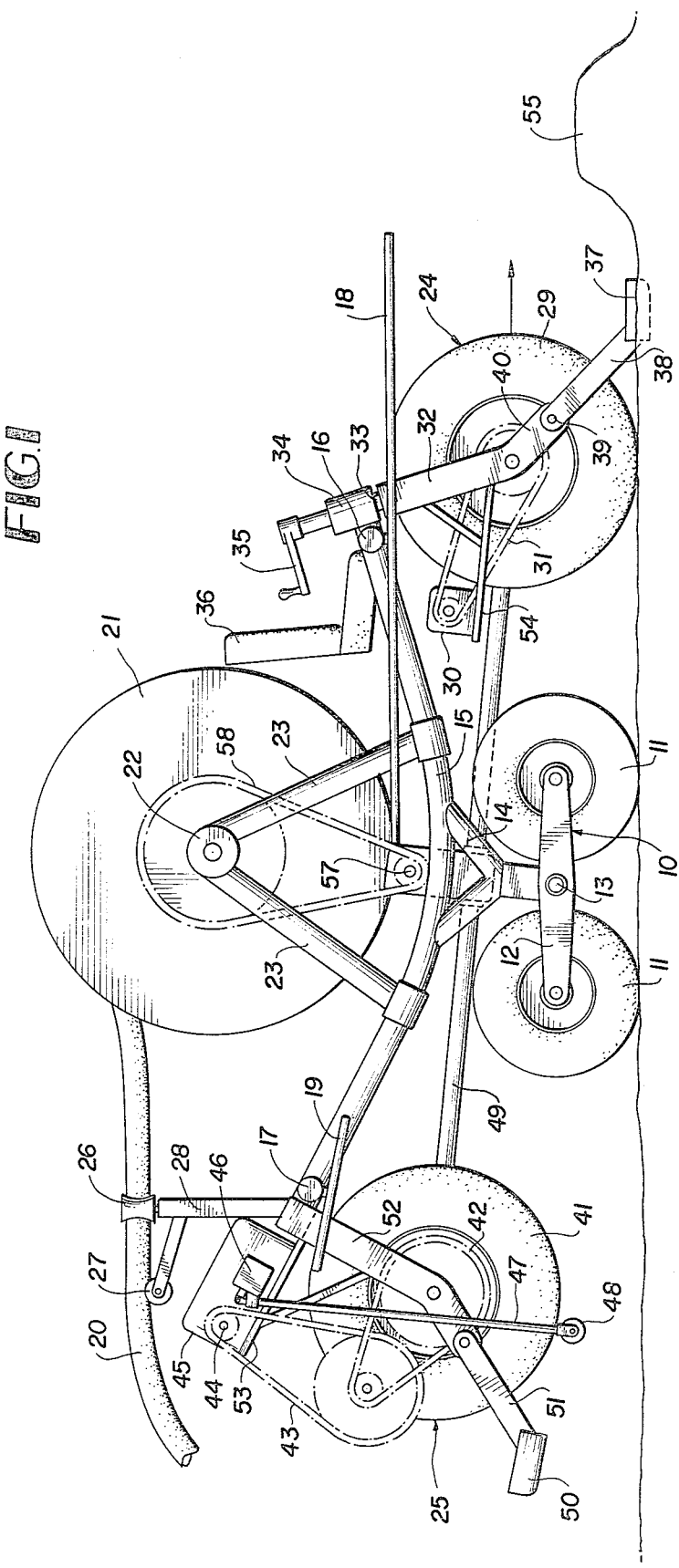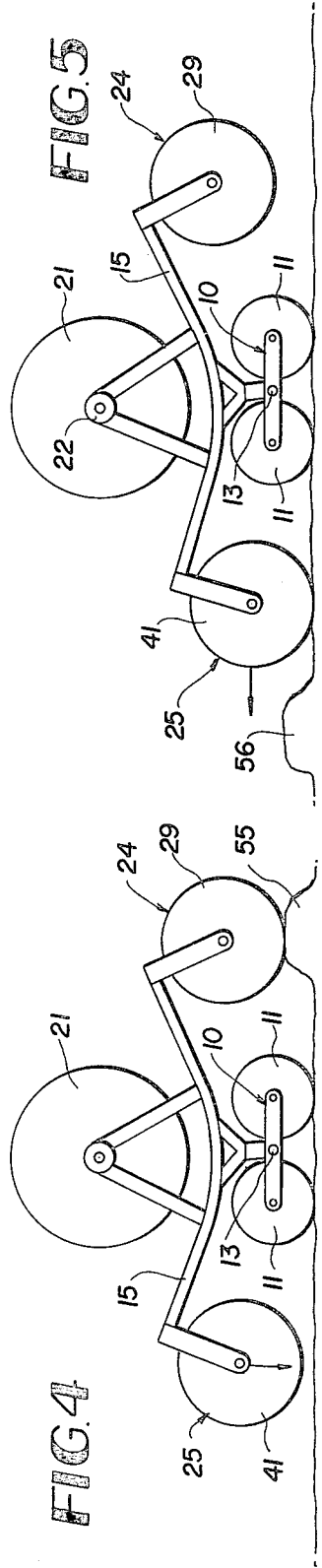

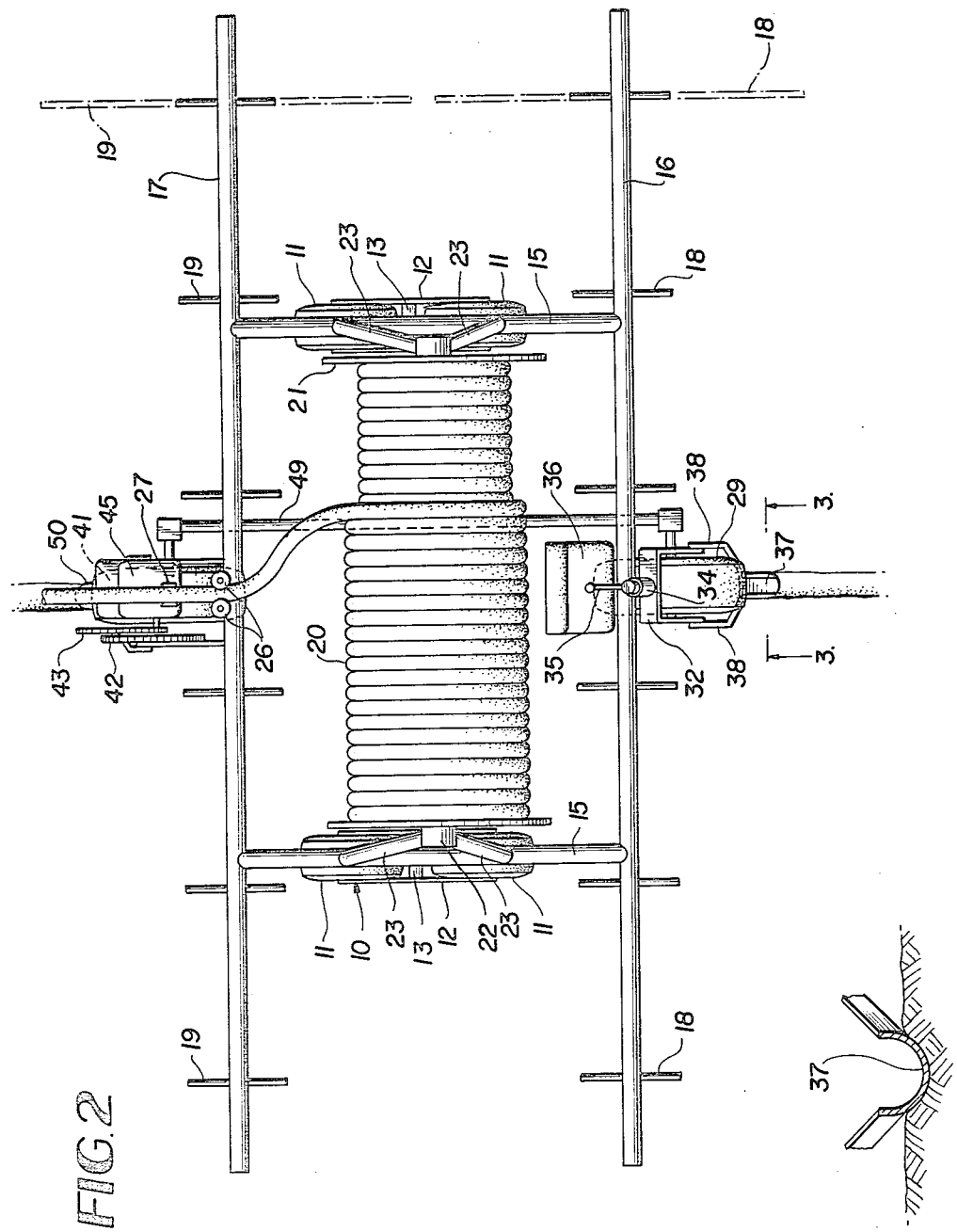

SELF-GUIDED REVERSIBLE TWO SPEED ROW CROP IRRIGATOR

CROSS-REFERENCE TO PRIOR APPLICATION

This application is a continuation-in-part of prior copending application Ser. No. 929,550, filed July 31, 1978, now U.S. Pat. No. 4,185,774, for SELF-STEERING CROP IRRIGATOR.

BACKGROUND OF THE INVENTION

Prior U.S. Pat. No. 4,119,272 to Tidwell and the above-referenced prior application both disclose self-propelled row crop irrigators having transverse irrigation booms which are fed from an overhead hose reel through a tubing frame which also serves to support the massive hose reel on a wheeled undercarriage. The irrigator in the referenced pending application is self-steering by the action of a furrow following wheel and a trailing shoe which follows in the small grooves produced by the guidance wheel.

The present invention is a substantial improvement on the above prior art, both in terms of simplifying the guiding shoe steering arrangement and in providing an irrigator which is self-reversing at the ends of crop rows and which has two speeds of operation, a slow speed for irrigating and a faster speed for maneuvering beyond the ends of crop rows.

The essence of the present invention lies in a rockable frame supported on a wheeled undercarriage having a fulcrum for the frame which mounts a massive hose reel directly above the fulcrum. The frame is tubular to conduct irrigating water from the hose to a pair of transverse fore and aft irrigation booms on the frame and forming parts thereof. Traction driving units are bodily connected with the two booms and are raised and lowered when the frame is rocked on the axis of the fulcrum. One traction unit has a ground-engaging reversing mechanism and the two traction units are coupled through a drive shaft which enables both units to be operated by the slow speed drive means of the irrigator associated with one of the traction units. The other traction unit includes a higher speed drive means independent of the slower speed means.

Other features and advantages of the invention will become apparent during the course of the following detailed description.

BRIEF DESCRIPTION OF THE DRAWINGS

FIG. 1 is a side elevation of an irrigator according to the invention in one travel mode.

FIG. 2 is a plan view of the irrigator.

FIG. 3 is an enlarged fragmentary transverse vertical section taken on line 3—3 of FIG. 2.

FIGS. 4 and 5 are partly diagrammatic side elevations of the irrigator depicting its automatic changing to a reverse travel mode.

DETAILED DESCRIPTION

Referring to the drawings in detail, wherein like numerals designate like parts, a wheeled undercarriage 10, FIG. 1, consists of widely spaced pairs of tandem wheels 11 carried by walking beams 12 having fulcrums 13 in the form of transverse axis shafts or trunnions secured to the lower ends of Y-shaped frame legs 14 rigidly attached at their tops to side longitudinal arcuate tubular rocker frame members 15. At their opposite ends, the side tubular members 15 are structurally connected and are also in internal communication with a pair of spaced parallel long transverse irrigation booms 16 and 17, each constructed in a similar manner to the single irrigation boom in the above-referenced prior patent and patent application. The booms 16 and 17 are equipped, respectively, with long and short horizontal longitudinal distributor tubes 18 and 19 whereby separate fore and aft streams of water from the booms can flow out of each distributor tube and into furrows between crop rows or directly onto crops. As suggested by the phantom lines in FIG. 2, the distributor tubes 18 and 19 of the booms 16 and 17 may be of equal lengths, either long or short, as distinguished from the arrangement shown in FIG. 1. The overall lengths of the booms 16 and 17 may be varied within practical limits to span several rows of crops.

Irrigation water from a remote stationary source is supplied through a hose 20 leading to said source and coiled in layers on a massive hose reel 21 above the fulcrum 13 of the wheeled carriage and symmetrically arranged therewith. As disclosed in the referenced patent and patent application, water from the hose 20 flows through the tubular axle 22 of the hose reel and from this axle into divergent tubular support arms 23 for the hose reel at each end of the same. From the arms 23, the irrigating water enters the longitudinal tubular members 15 and from them passes into the irrigation booms 16 and 17. Thus, the rockable framework which supports the hose reel 21 and fore and aft drive and traction units 24 and 25, to be described in detail, also serves to convey water from the hose 20 to the two spray booms. Near one end, the rockable frame is equipped with suitable hose guidance means 26 and 27 on a suitable standard 28.

The irrigator further comprises in the forward drive and traction unit 24 a center traction wheel 29 adapted to be driven directly by a relatively high speed power drive means 30, such as an engine, coupled through gearing 31 with the axle of wheel 29. The wheel 29 is mounted on a steering fork 32 having its upper shaft extension 33 journaled in a bearing 34 rigid with the forward boom 16. A manual steering lever 35 for the steering fork 32 is provided adjacent to an operator's seat 36 also supported on the boom 16 at the transverse center of the machine.

A driver is not required to steer the machine during crop irrigation, but only at such times as the machine is maneuvering in a field as when it is being positioned to begin an irrigation sequence. During such maneuvers, the higher speed drive 30 is operated to drive the traction wheel 29 and an operator on the seat 36 manually steers the machine. During row crop irrigation, steering of the wheel unit 24 is automatic under control of a dished trough-like guidance shoe 37 which cuts its own small furrow and rides in advance of the wheel 29, being connected thereto by arms 38 pivoted at 39 to lower extensions 40 of the fork 32.

The opposite or rear traction wheel unit 25 similarly includes a single traction wheel 41 in tandem relationship with the wheel 29 and being independently driven at a slower speed through gearing 42 and 43 coupled with the output shaft 44 of an engine 45 fixedly mounted on the framework of the machine. The engine 45 includes a reversing gear 46 on one side thereof having a descending operating link 47 terminating in a ground engaging element 48. A longitudinal drive shaft 49 transmits power from the slow speed traction wheel 41 to the wheel 29 so that both traction wheels can be operated in the slow speed mode during the irrigation cycle without employing the higher speed drive 30.

The traction wheel unit 25 also has a guidance shoe 50 for automatic steering identical to the described shoe 37. The shoe 50 is connected through arms 51 with a steering fork 52 for wheel 41 and the entire power train for the wheel 41 including the engine 45 and its platform 53 turns with the wheel 41 during steering by the shoe 50. Similarly, the engine 30 and its platform 54 and associated gearing turns or steers with the wheel 29 in response to the action of shoe 37.

During operation, as previously explained, the drive or engine 30 is operated with the traction wheel 29 down and the shoe 37 elevated and with an operator on the seat 36 steering the machine in various maneuvers prior to or following crop irrigation. At the completion of such maneuvers and during actual irrigation cycles, the human operator is no longer required. Referring to FIG. 1, the wheel 29 and the steering shoe 37 are both down and the rear unit 25 is elevated. The center of gravity of the massive reel 21 is to the right of the fulcrum 13 and the machine is stable in the position shown in FIG. 1. Slow speed rotation is imparted to the wheel 29 from the slow speed power drive 45 through the drive shaft 49. The irrigator now travels slowly in the direction of the arrow in FIG. 1 and is self-steering while row crops are being thoroughly watered.

At the ends of the crop rows, a mound 55 either artificial or natural is engaged by the traction wheel 29, FIG. 4, which wheel rides up onto the mound and causes the machine to rock on the fulcrum 13 to a point where the center of gravity of the reel 21 passes dead center in relation to the fulcrum and swings beyond dead center on the opposite side of the fulcrum to that shown in FIG. 1. As this occurs, the rear traction wheel 41 is moving toward engagement with the ground as depicted in FIG. 4 and the traction wheel 29 now remains elevated. As this activity takes place, the reversing actuator 48 also strikes the ground and raises the reversing link 47 which reverses the slow speed drive 45 and causes the irrigator to travel in the reverse direction shown in FIG. 5 under influence of the traction wheel 41, as shown by the arrow in FIG. 5. Irrigation of row crops now takes place in the same manner and at the same speed although in reverse direction compared to FIG. 1.

Another mound 56 is eventually approached after the machine traverses the field in the reverse direction and when the wheel 41 rides up onto this mound, the unit 25 is elevated and the unit 24 is again lowered and the machine returns to its operational mode in FIG. 1. The irrigator is self-propelled at two selective speeds, is automatically reversing at the ends of crop rows, and is self-steering in both directions while in the irrigation mode. It should be mentioned that, when the driving unit 25 is elevated by contact with the mound 56, the weight of the link 47 again returns the drive 45 to the forward mode shown in FIG. 1 through the reversing gear 46. The key to the mode of operation is the fulcrum 13 which allows the center of gravity of the machine to shift back and forth between the positions in FIGS. 1 and 5, the machine being stable in either position.

As shown in FIG. 1, the hose reel 21 has a power drive means 57 and transmission means 58 entirely independent of the driving means of traction units 24 and 25. This driving means 57 also rocks with the tubular frame, the spray booms 16 and 17, the two units 24 and 25, and the drive shaft 49 around the transverse axis of fulcrum 13 when either of the mounds 55 or 56 is engaged by one of the traction wheels 29 or 41.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A row crop irrigator comprising a wheeled carriage having a fulcrum, a piping frame rockably supported on the fulcrum and extending fore and aft thereof, a hose reel mounted upon the piping frame above the fulcrum and being rockable with the piping frame and including tubular supports communicating with the interior of the piping frame whereby a hose coiled on said reel may deliver irrigation water through said supports to the interior of the piping frame, fore and aft transverse irrigation booms on the piping frame near the front and rear thereof and on opposite sides of the wheeled carriage, a slow speed powered traction wheel unit bodily mounted on one end of the piping frame and including a ground-engaging reversing element, and a higher speed powered traction wheel unit bodily mounted on the other end of the piping frame, and transmission means drivingly interconnecting said powered traction wheel units whereby both units can be driven at said slow speed.

2. A row crop irrigator as defined in claim 1, and furrow following steering elements carried by said traction wheel units whereby the irrigator is self-steering along crop rows in opposite directions.

3. A row crop irrigator as defined in claim 1, and a manual steering means for said higher speed powered traction wheel unit enabling the irrigator to be maneuvered when not in an irrigation mode.

4. A row crop irrigator as defined in claim 1, and longitudinal open-ended irrigation water distributor tubes carried by each boom in spaced relationship thereon so that multiple streams of water can be delivered by each boom to plural rows to crops.

5. A row crop irrigator as defined in claim 1, and an independent power drive means for the hose reel on said irrigator.

6. A row crop irrigator as defined in claim 1, and said slow speed and higher speed traction wheel units each comprising engine means and a single driven traction wheel at the transverse center of the irrigator, the two traction wheels being in tandem relationship fore and aft of the wheeled carriage, and the wheeled carriage including wheels spaced laterally outwardly of said traction wheels equidistantly therefrom.

7. A row crop irrigator as defined in claim 6, and the wheels of said carriage comprising a pair of tandem wheels on each side of the carriage, and walking beams carrying the carriage wheels and being rockable on said fulcrum.

8. A row crop irrigator as defined in claim 1, and a mound at each end of the path of movement of said irrigator engageable with one of said traction wheel units and elevating such unit from the ground and simultaneously lowering the other traction wheel unit into contact with the ground, the center of gravity of the irrigator then swinging on said fulcrum from a point beyond one side thereof to a point beyond the other side thereof, whereby the irrigator is rendered stable when either traction wheel unit is engaged with the ground.

* * * * *